G. H. WILSON.
PULLEY ATTACHMENT FOR AUTOMOBILES.
APPLICATION FILED NOV. 13, 1915. RENEWED APR. 17, 1918.
1,326,557.
Patented Dec. 30, 1919.
2 SHEETS—SHEET 1.
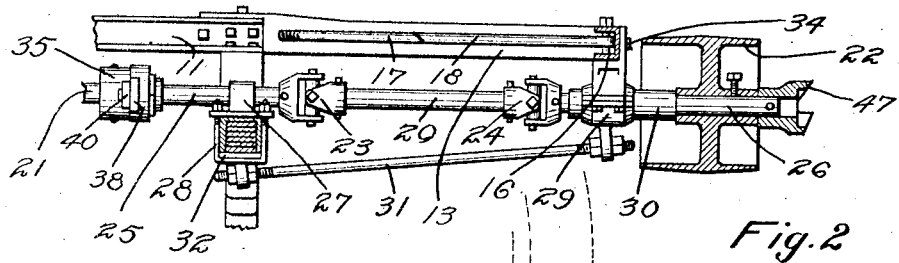
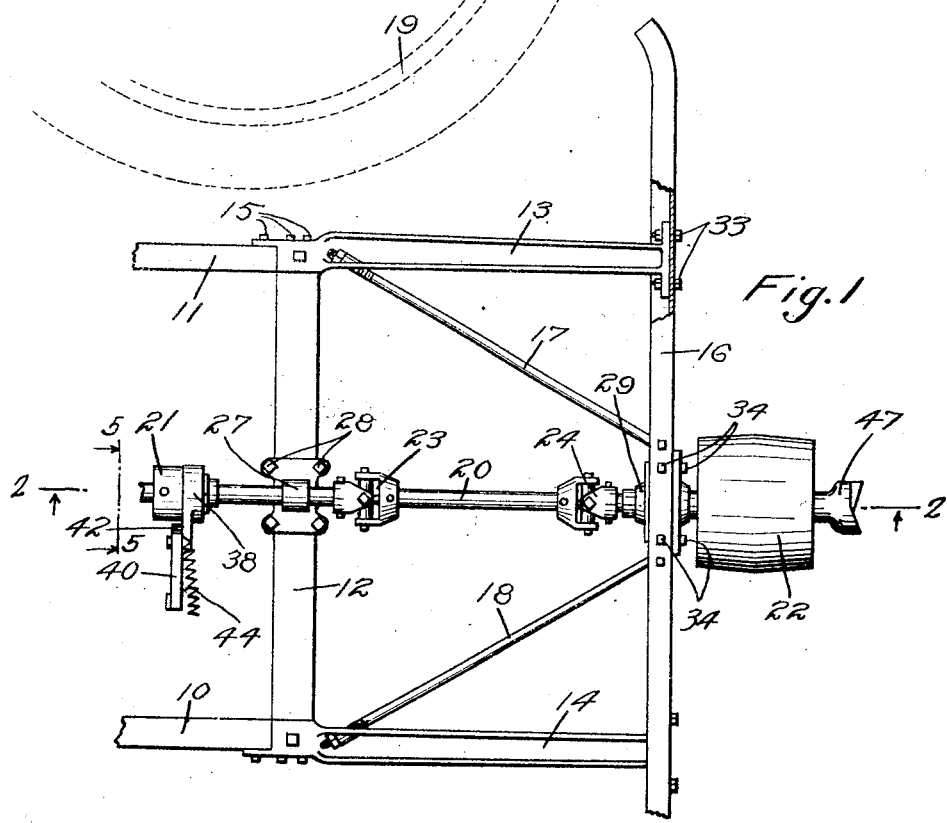

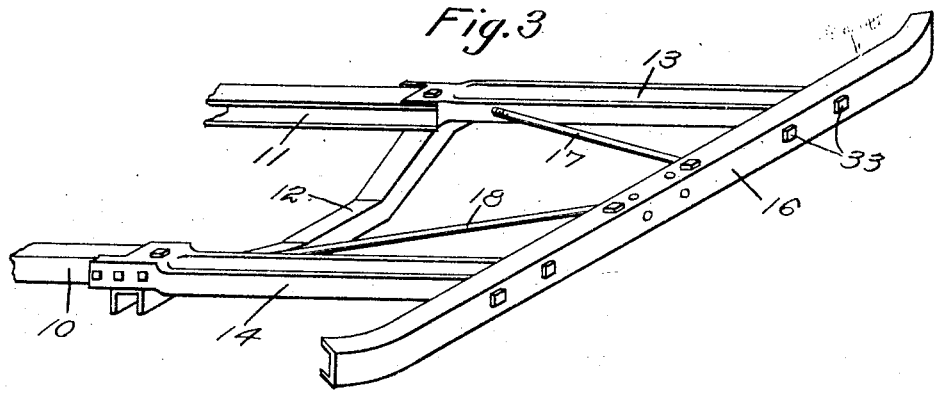
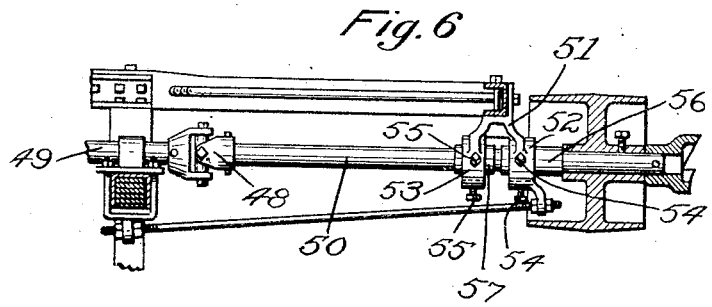
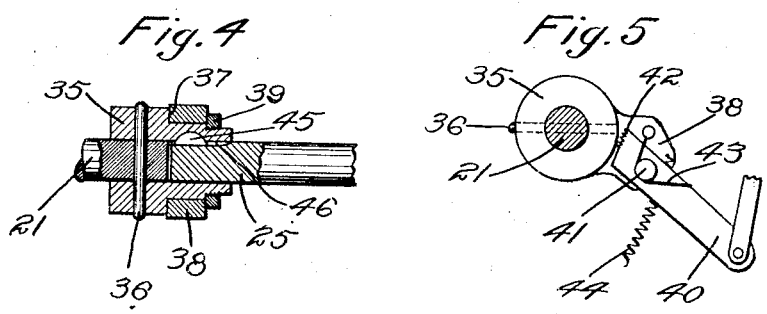

UNITED STATES PATENT OFFICE.

GEORGE H. WILSON, OF MINNEAPOLIS, MINNESOTA.

PULLEY ATTACHMENT FOR AUTOMOBILES.

1,326,557.  Specification of Letters Patent.  Patented Dec. 30, 1919.

Application filed November 13, 1915, Serial No. 61,235. Renewed April 17, 1918. Serial No. 229,201.

*To all whom it may concern:*

Be it known that I, GEORGE H. WILSON, a citizen of the United States, residing at Minneapolis, in the county of Hennepin and State of Minnesota, have invented certain new and useful Improvements in Pulley Attachments for Automobiles, of which the following is a specification.

My invention relates to pulley attachments for automobiles and has for its object to provide a frame extension which shall constitute a bumper, said extension being rigidly connected with the frame of the automobile, and to apply to said frame extension a removable bearing system in which is mounted a shaft and a pulley, said shaft embodying one or more universal joints and being coupled to the crank shaft of the engine by a coupling device which also comprises a starter element for the engine either when the pulley shaft is attached or not attached. The bumper and pulley supporting frame may be kept permanently upon the automobile but the pulley device may readily be attached to and detached from said frame as the same is requisite to be used.

The full objects and advantages of my invention will appear in connection with the detailed description thereof and are particularly pointed out in the claims.

In the drawings, illustrating the application of my invention in one form,—

Figure 1 is a plan view of a portion of the frame of an automobile showing my bumper with the pulley and power shaft attached. Fig. 2 is a sectional elevational view taken on line 2—2 of Fig. 1. Fig. 3 is a perspective view of the same part of the automobile frame as shown in Fig. 1 including the bumper but with the pulley, shaft and bearings detached. Fig. 4 is a sectional view of the starter and shaft coupler showing the method of attaching the auxiliary shaft. Fig. 5 is a sectional view taken on line 5—5 of Fig. 1 showing the type of starter used. Fig. 6 is a view similar to Fig. 2 of a modification of the structure shown in that figure.

The bumper element of my invention is clearly shown in Figs. 1, 2 and 3. The frame of an automobile comprising longitudinal members 10 and 11 and a transverse member 12 shown having my invention attached thereto. A pair of extension beams 13 and 14 are secured at one end to the frame members 10 and 11 by means of bolts 15 and have attached to their other ends a bumper bar 16 by means of bolts 33. This framework may be made of channel cross-section, as indicated in the drawings, or of other suitable sections, and is braced by rods 17 and 18 attached to the bar 16 near its center and to the beams 13 and 14 at their ends remote from said bar. Thus a rigid bumper of substantial construction is provided which, as noted in Fig. 2, extends beyond the front wheels 19 a sufficient amount so that the bumper bar 16 clears the front wheels. When the pulley attachment is removed the bumper appears as shown in Fig. 3.

To the engine shaft 21 is coupled a shaft 25 which is universally connected at 23 to a shaft 20, which latter shaft is itself universally connected at 24 to another shaft 26. Shaft 25 is journaled in a bearing 27 secured to the frame member 12 by means of U-bolts 28, and shaft 26 is journaled in a bearing 29 bolted to the bumper bar 16 by bolts 34. Outside of bar 16 is secured to shaft 26 a pulley 22 from which the power of the engine may be transmitted. As shaft 26 is only supported by one bearing, the bushing 30 of that bearing is made long to hold said shaft rigidly and hence extends within the pulley 22, as clearly shown in Fig. 2. A brace rod 31 connects the lower portion of bearing 29 with a casting 32 secured by the U-bolts 28 against the lower portion of frame member 12, thus reinforcing said bearing.

The coupling for shafts 21 and 25 is shown in detail in Fig. 4. This coupling serves an additional purpose, namely, as a starter for the engine, the principal features of which are shown in Fig. 5. The utility of this arrangement becomes evident inasmuch as it would be difficult to crank the engine from without with the bumper framework in place. A starting device attachable to the shaft 21, capable of serving as a coupling and operable from the seat of the automobile, would hence be requisite in operating the same as a vehicle. As seen in Figs. 5 and 4, a cylindrical casting 35 is attached to the shaft 21 by means of a pin 36. This casting is provided with a shoulder 37 against which an arm 38 is held for rotational motion thereon by means of a nut 39. Pivoted to arm 38 at 41 is a lever 40 provided with teeth 42 spirally situated with respect to the center 41 and engageable with the periphery of casting 35 to cause said casting and shaft 21 to rotate with it and said arm 38, in one direction. Counter clockwise rotation of lever 40, as viewed in Fig. 5, will hence turn over the engine shaft, the starting parts being restored to their normal positions by springs 43 and 44. The coupling embodied in this starter is shown in Fig. 4. A key 45 is set into the casting 35 and engages a keyway 46 milled into the end of shaft 25. The key 45 may be of the type shown, which always remains in position, or of any other suitable type. As arranged, shaft 25 may be slid in its coupling and so prevents binding. At the free end of shaft 26, adjacent pulley 22, may lie placed a casting 47 for use in conjunction with a hand crank for cranking the engine from the shaft 26 when the power is used for stationary purposes. This device is not absolutely essential but may be found desirable.

In detaching the pulley attachment it only becomes necessary to remove bearings 27 and 29 by loosening bolts 28 and 34. The brace rod 31 is at the same time loosened and it simply remains to pull shaft 25 out of its coupling and pick up the key 45. In assembling the device the reverse process is followed and, due to the universal joints 23 and 24, the bearings do not have to be carefully alined.

A modified form of my invention is shown in Fig. 6. In this form the bumper framework is the same as in the preferred form, but a single universal coupling 48 is employed connecting shafts 49 and 50. The bearing supporting shaft 50 comprises a bifurcated supporting member bolted to the bumper bar 16 having cast integral therewith a pair of sleeves 52 and 53. Within sleeves 52 and 53 are adjustably positioned through set-screws 54 and 55 bearing bushings 56 and 57. The object of this arrangement is to provide a long bearing for shaft 50 with a double support, and the adjusting means included make exact alinement of these two bearings possible. The principal advantage of this form of construction is that shaft 50 is of considerable length, so that greater rigidity is procurable.

I claim:

1. In combination with the side frame members and the engine crank shaft of an automobile, a pair of extension beams rigidly secured to said frame members, a transverse bumper bar secured to the front ends of said beams, a pair of brace rods secured respectively to said beams near their ends which are remote from said bumper bar and secured to said bar near its center, a bearing removably secured to said bumper bar, a shaft in said bearing in alinement with said crank shaft and connected thereto, a pulley secured to said shaft outside of said bumper bar, and a coupling uniting said shaft with the crank shaft.

2. In combination with the side frame members, the front transverse frame member and the engine crank shaft of an automobile, a pair of extension beams rigidly secured to said side frame members, a transverse bumper bar secured to the front ends of said beams, a pair of brace rods secured respectively to said beams near their ends which are remote from said bumper bar and secured to said bar near its center, a bearing removably secured to said bumper bar, a brace rod connecting said bearing with said transverse frame member, a shaft in said bearing in alinement with said crank shaft and connected thereto, a pulley secured to said shaft outside of said bumper bar, and a coupling uniting said shaft with the crank shaft.

3. In combination with the side frame members and the engine crank shaft of an automobile, a pair of extension bars rigidly secured to said frame members, a transverse bumper bar secured to the front ends of said beams, a bearing removably secured to said bumper bar, a shaft in said bearing in alinement with said crank shaft, a pulley secured to said shaft outside of said bumper bar, a coupling uniting said shaft with said crank shaft, an arm rotatably mounted on said coupling, and a lever pivoted to said arm, said lever having teeth adapted to engage said coupling, when the lever is turned in one direction, and disengage said coupling when the lever is turned in the other direction.

In testimony whereof I affix my signature in presence of two witnesses.

GEORGE H. WILSON.

Witnesses:
H. A. BOWMAN,
ALEX. LAGAARD.